United States Patent
Piirainen

(10) Patent No.: US 7,224,705 B2
(45) Date of Patent: May 29, 2007

(54) SYNCHRONIZATION OF A MULTI-MODE BASE STATION USING A COMMON SYSTEM CLOCK

(75) Inventor: Olli Piirainen, Oulu (FI)

(73) Assignee: Nokia Corporation, Espoo (FI)

(*) Notice: Subject to any disclaimer, the term of this patent is extended or adjusted under 35 U.S.C. 154(b) by 607 days.

(21) Appl. No.: 10/731,427

(22) Filed: Dec. 10, 2003

(65) Prior Publication Data

US 2004/0114468 A1    Jun. 17, 2004

Related U.S. Application Data

(63) Continuation of application No. PCT/FI01/00583, filed on Jun. 19, 2001.

(51) Int. Cl.
*H04J 3/06* (2006.01)
*G04C 11/02* (2006.01)
*H04L 7/00* (2006.01)

(52) U.S. Cl. .................. 370/503; 368/47; 370/509; 375/356; 455/436

(58) Field of Classification Search ............ 368/10, 368/46, 47; 370/503, 509–514; 375/354, 375/356; 455/436, 502
See application file for complete search history.

(56) References Cited

U.S. PATENT DOCUMENTS

| | | | | |
|---|---|---|---|---|
| 5,822,314 A | * | 10/1998 | Chater-Lea | 370/337 |
| 5,872,820 A | * | 2/1999 | Upadrasta | 375/356 |
| 6,711,149 B1 | * | 3/2004 | Yano et al. | 370/342 |
| 7,085,294 B2 | * | 8/2006 | Longoni et al. | 370/509 |

FOREIGN PATENT DOCUMENTS

| | | |
|---|---|---|
| EP | 1 030 477 A2 | 8/2000 |
| WO | WO 01/18998 A1 | 3/2001 |

* cited by examiner

*Primary Examiner*—Vit W. Miska
(74) *Attorney, Agent, or Firm*—Squire, Sanders & Dempsey L.L.P.

(57) ABSTRACT

A method for synchronizing a multi-mode base station using one clock, when the systems to be synchronized are a GSM-type telecommunications system, for instance a GSM or EDGE system, and a WCDMA-type telecommunications system. In the method, the clock of the WCDMA-type system or a multiple thereof is selected as the system clock of the multi-mode base station, the system clock of the GSM-type system is implemented using multiples of the frequency of the selected clock, and the frame structure of the GSM-type system is synchronized at intervals of thirteen frames or a multiple of thirteen frames.

21 Claims, 5 Drawing Sheets

SYNCHRONIZATION OF A MULTI-MODE BASE STATION USING A COMMON SYSTEM CLOCK

This application is a continuation of international application PCT/FI01/00583 filed Jun. 19, 2001, which designated the US and was published under PCT article 21(2) in English.

FIELD OF THE INVENTION

The invention relates to a method for synchronizing a multi-mode base station using one clock, when the systems to be synchronized are a GSM-type (Global System for Mobile Communications) telecommunications system and a WCDMA-type (Wideband Code Division Multiple Access) system. In this application, a GSM-type system refers to the GSM system and its modifications and to GPRS (General Packet Radio System), EGPRS (Enhanced General Packet Radio System) and IS-136HS (interim Standard) systems. In this application, a WCDMA-type system refers to different WCDMA systems, such as UMTS (Universal Mobile Telecommunications System).

BACKGROUND OF THE INVENTION

Wireless telecommunications are experiencing a critical stage as a change from second generation networks to third generation networks is taking place. At least for some time, networks of both generations are being used in parallel, because teleoperators have invested in network equipment and end-users in telephones. In addition, it will take time before the operators can make the networks of the new system geographically comprehensive. The most known of the second generation systems is probably the GSM system and its modifications, such as EDGE (Enhanced data rates for GSM evolution). Of the third generation systems, systems based on the WCDMA technology are expected to achieve the most prominent position. Thus, there is a need to implement a multi-mode base station which serves both the GSM networks and the WCDMA networks. Such a multi-mode base station will be able to cover several networks in a cost-effective manner. A problem arises, however, from the fact that the clock frequencies of different systems differ from each other. This can be solved by each system having a clock of its own. A problem then arises from the fact that clock frequencies are typically implemented by oven-controlled oscillators which are large and expensive components.

BRIEF DESCRIPTION OF THE INVENTION

It is thus an object of the invention to provide a method and arrangement with which the synchronization of a multi-mode base station can be implemented using one clock. This is achieved by a method for synchronizing a multi-mode base station using one clock, when the systems to be synchronized are a GSM-type telecommunications system and a WCDMA-type telecommunications system. In the method of the invention, the clock of the WCDMA-type system or a multiple thereof is selected as the system clock of the multi-mode base station, the system clock of the GSM-type system is implemented using multiples of the frequency of the selected clock, the frame structure of the GSM-type system is synchronized at intervals of thirteen frames or a multiple of thirteen frames.

The invention also relates to an arrangement for synchronizing a multi-mode base station using one clock, when the systems to be synchronized are a GSM-type telecommunications system and a WCDMA-type telecommunications system. In the arrangement of the invention, the multi-mode base station comprises means for implementing the system clock of the GSM-type system using multiples of the frequency of the WCDMA-type system clock, the multi-mode base station comprises means for synchronizing the frame structure of the GSM-type system at intervals of thirteen frames or a multiple of thirteen frames.

The invention also relates to a multi-mode base station using one clock, comprising means for implementing the system clock of the GSM-type system using multiples of the frequency of the WCDMA-type system clock, means for synchronizing the frame structure of the GSM-type system at intervals of thirteen frames or a multiple of thirteen frames.

The invention also relates to a multi-mode base station using one clock, comprising implementing means implementing the system clock of the GSM-type system using multiples of the frequency of the WCDMA-type system clock, synchronizing means synchronizing the frame structure of the GSM-type system at intervals of thirteen frames or a multiple of thirteen frames.

Preferred embodiments of the invention are disclosed in the dependent claims.

The invention is based on selecting a clock implementing the chip rate of the WCDMA-type system as the clock of the multi-mode base station. The system clock frequency of the GSM-type system is implemented using multiples of the frequency (3.84 MHz) of the selected clock, i.e. the property is utilized that the clocks of both systems can be presented as multiples of 40 kilohertz. The synchronization of the frame clock of the GSM system is done by synchronizing the frame structure at intervals of thirteen frames or a multiple of thirteen frames, because when using a system clock described above, the timing of GSM frames is generally with sufficient accuracy correct at intervals of thirteen frames.

The method and arrangement of the invention provide the advantage that a multi-mode base station can be implemented using only one clock. The reduction in clock components saves costs in the manufacture of base stations, because oven-controlled oscillators are expensive. In addition, oven-controlled oscillators are large in size and produce a great deal of heat. Thus, reducing their number saves space and makes keeping the internal temperature of the base station sufficiently low easier.

BRIEF DESCRIPTION OF THE FIGURES

The invention will now be described in greater detail by means of preferred embodiments with reference to the attached drawings, in which.

DESCRIPTION OF THE EMBODIMENTS

Figure 1:
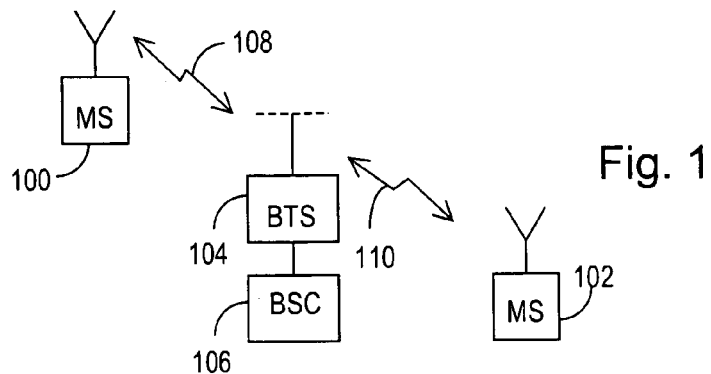
FIG. 1 shows an example of a TDMA (Time Division Multiple Access) telecommunications system.

FIG. 1 illustrates in a simplified manner one digital data transmission system to which the solution of the invention can be applied. It is a cellular system which comprises a base station 104 having a bi-directional connection 108 and 110 to subscriber terminals 100 and 102, which can be fixed terminals, terminals located in vehicles or portable terminals. The base station has transceivers, for instance. The transceivers of the base station are connected to an antenna unit which has a bidirectional radio link to a subscriber terminal. The base station is further connected to a base station controller 106 which switches the connections of the terminals elsewhere in the network. The base station controller controls in a centralized manner the base stations connected to it. The base station controller has a group switching field which is used for speech and data connection and to connect signalling circuits. The base station system formed by the base station and the base station controller also comprises a transcoder (not shown in the figure). The transcoder is usually located as close as possible to a mobile switching centre, because it is then possible to transmit speech in cellular network format between the transcoder and base station controller, thus saving transmission capacity. A control unit in the base station controller takes care of call control, mobility management, collection of statistics and signalling.

The cellular system can also be connected to a public switched telephone network, in which case the transcoder converts the different digital speech coding formats used between the public network and cellular network to suit each other.

Figure 2:
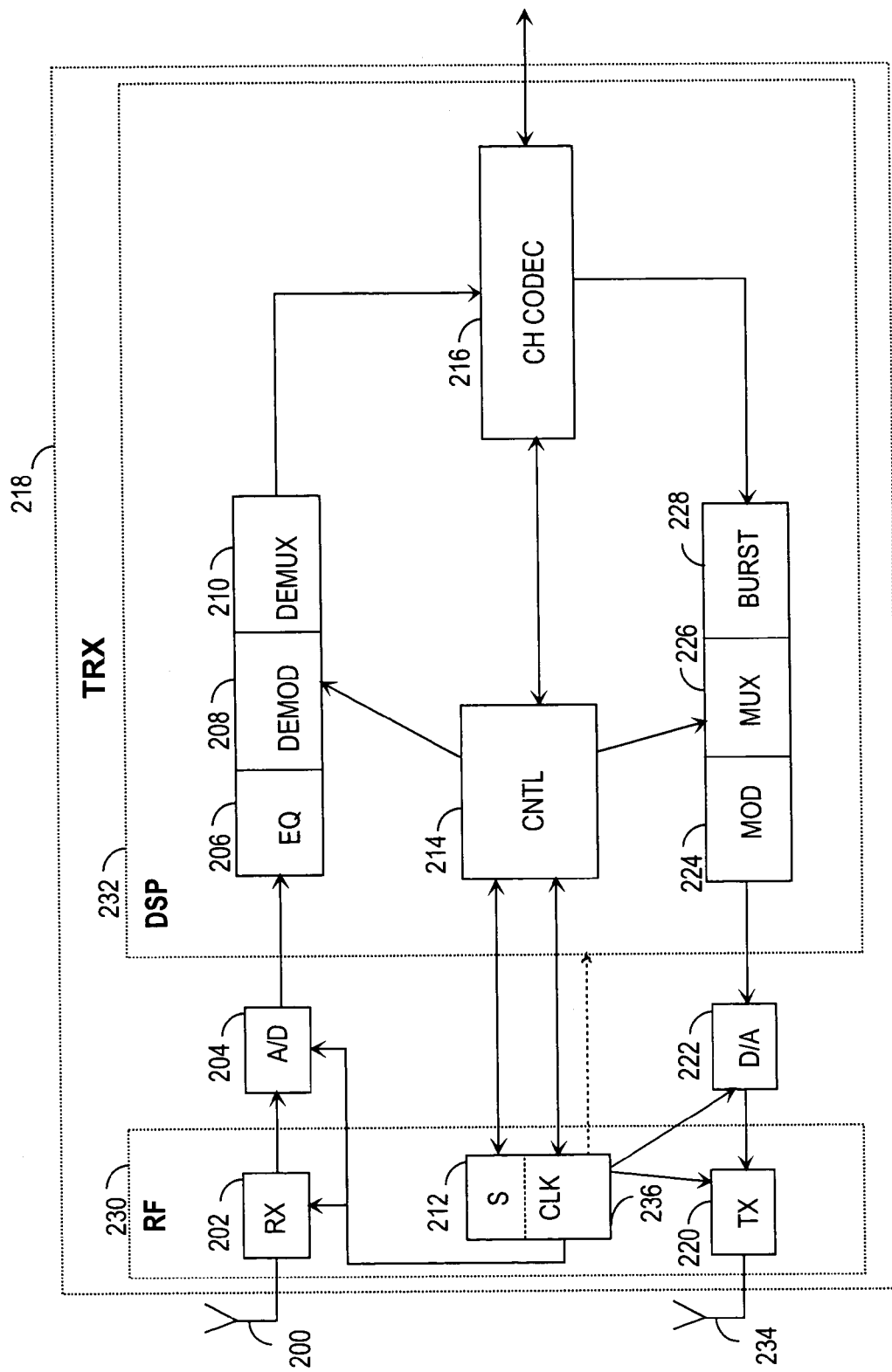
FIG. 2 shows an example of a TDMA transceiver.

FIG. 2 shows by means of a block diagram an example of a transceiver of one system employing time division multiple access, i.e. a GSM-type system, for instance. It is clear to a person skilled in the art that the transceiver also contains other parts than those described above with reference to FIG. 2.

A signal is received by an antenna 200, which can also be a group antenna.

A receiver 202 belonging to radio frequency parts 230 comprises a filter which blocks frequencies outside the desired frequency band. Next, the signal is converted to an intermediate frequency or directly to base band, and the resulting signal is sampled and quantized in a analogue-to-digital converter 204. Then the signal is forwarded to a digital signal processor and its software 232.

A channel equalizer 206 compensates for interference, for instance interference caused by multipath propagation. From the equalized signal, a demodulator 208 takes a bit stream that is transferred to a demultiplexer 210. The demultiplexer 210 separates the bit stream from different time-slots to specific logical channels. A channel codec 216 decodes the bit stream of the different logical channels, i.e. decides whether the bit stream is signalling information to be transferred to a control unit 214, or whether the bit stream is speech to be transferred to a speech codec of the base station controller 106. The channel codec 216 also performs error correction. The control unit 214 carries out internal control tasks by controlling the different units.

In transmission, a burst generator 228 adds a known sequence and a tail to the data received from the channel codec 216. A multiplexer 226 assigns a specific time slot to each burst. A modulator 224 modulates the digital signals to a radio frequency carrier. The signal is converted from digital to analogue using a digital-to-analogue converter 222A, 222B. The signal is forwarded to a transmitter 220.

The transmitter comprises a filter restricting the bandwidth. In addition, the transmitter controls the output power of a transmission. Finally, the signal to be transmitted is forwarded to an antenna 234. Differing from the figure, the receiver and transmitter can have a common antenna, in which case a duplex filter is needed.

A synthesizer 212 arranges the required frequencies for the different units. The synthesizer comprises a clock 236 which can be locally controlled or it can be centrally controlled from somewhere else, for instance from the base station controller 106. In GSM systems, the system clock provides the required symbol rate (13 MHz) and frame synchronization.

The synthesizer generates the required frequencies by means of a voltage-controlled oscillator (VCO), for instance.

Figure 3:
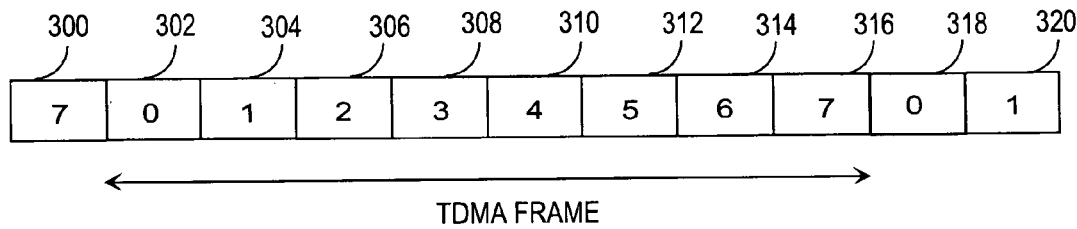
FIG. 3 shows an example of the frame structure of a GSM system.

Next, an example of one GSM frame is described by means of FIG. 3. The GSM system utilizes time division multiple access (TDMA) to improve the use of the frequency resource. The figure shows time slots, of which the time slots 304, 306, 308, 310, 312, 314, 316 form an 8-time-slot frame. The time slots 300, 302 belong to the previous frame and the time slots 318, 320 to the next frame. Each time slot in a frame is allocated to a single user or alternatively, it is also possible to allocate several time slots to one user to improve the data transmission rate. All users of the same frequency share a common frame. Each user only uses the allocated time slot and remains silent during other time slots, in other words, one user always uses for instance the second time slot in each frame. The transmission is thus burstlike. The duration of one time slot is 577 μs and the duration of a frame is 4.615 ms.

WDCMA systems also use a frame structure, for instance one frame is made up of 15 time slots and the duration of a frame is 10 ms.

Figure 4:
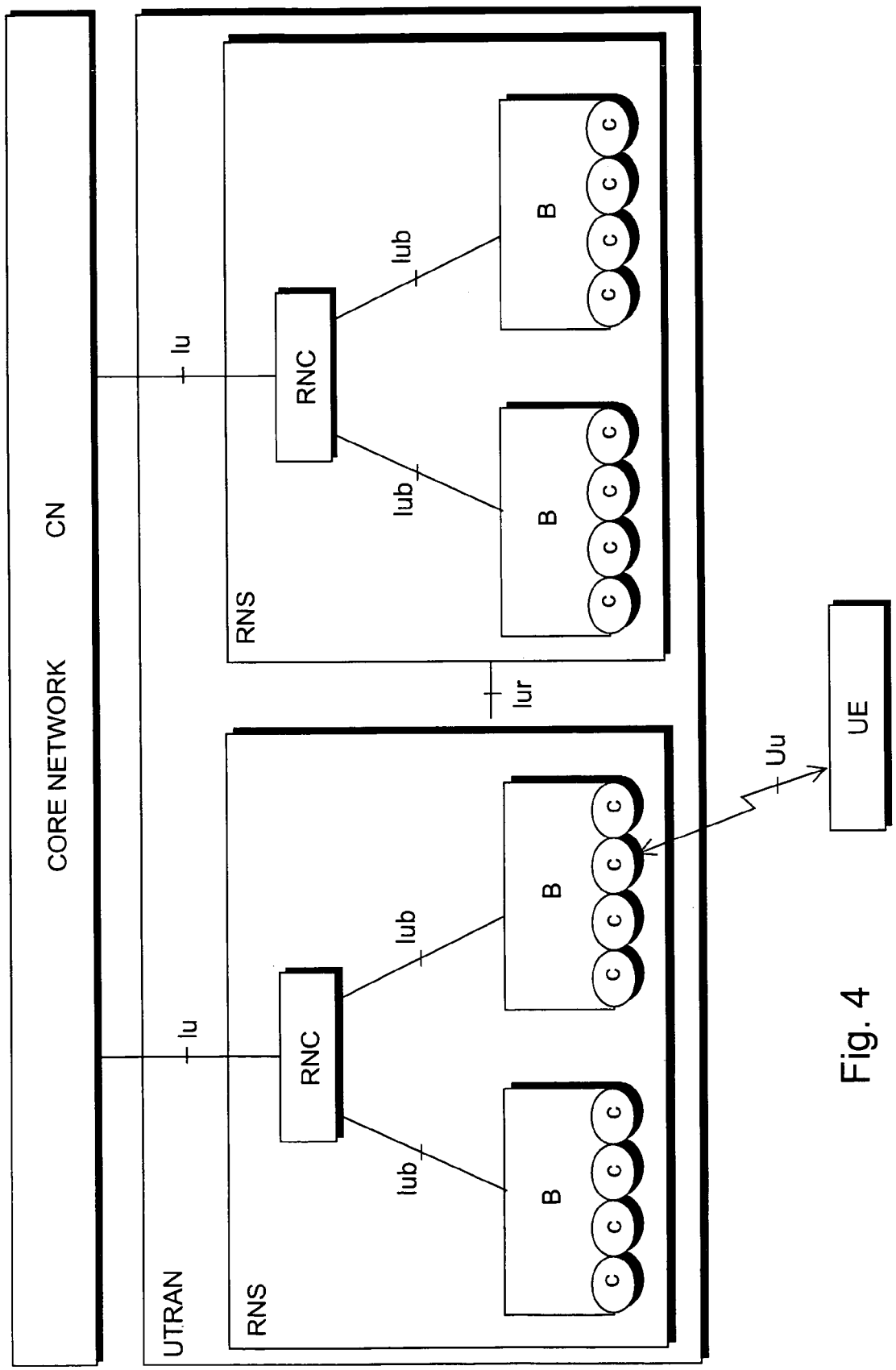
FIG. 4 shows an example of a WCDMA telecommunications system.

The structure of one wideband mobile system is described by way of example with reference to FIG. 4. The main parts of a mobile system is a core network CN, a universal terrestrial radio access network UTRAN and user equipment UE. The interface between CN and UTRAN is called Iu and the air interface between UTRAN and UE is called Uu.

UTRAN is made up of radio network subsystems RNS. The interface between RNSs is called Iur. RNS is made up of a radio network controller RNC and one or more nodes B. The interface between RNC and B is called Iub. The coverage area, i.e. cell, of a node B is marked C in the figure.

Figure 5:
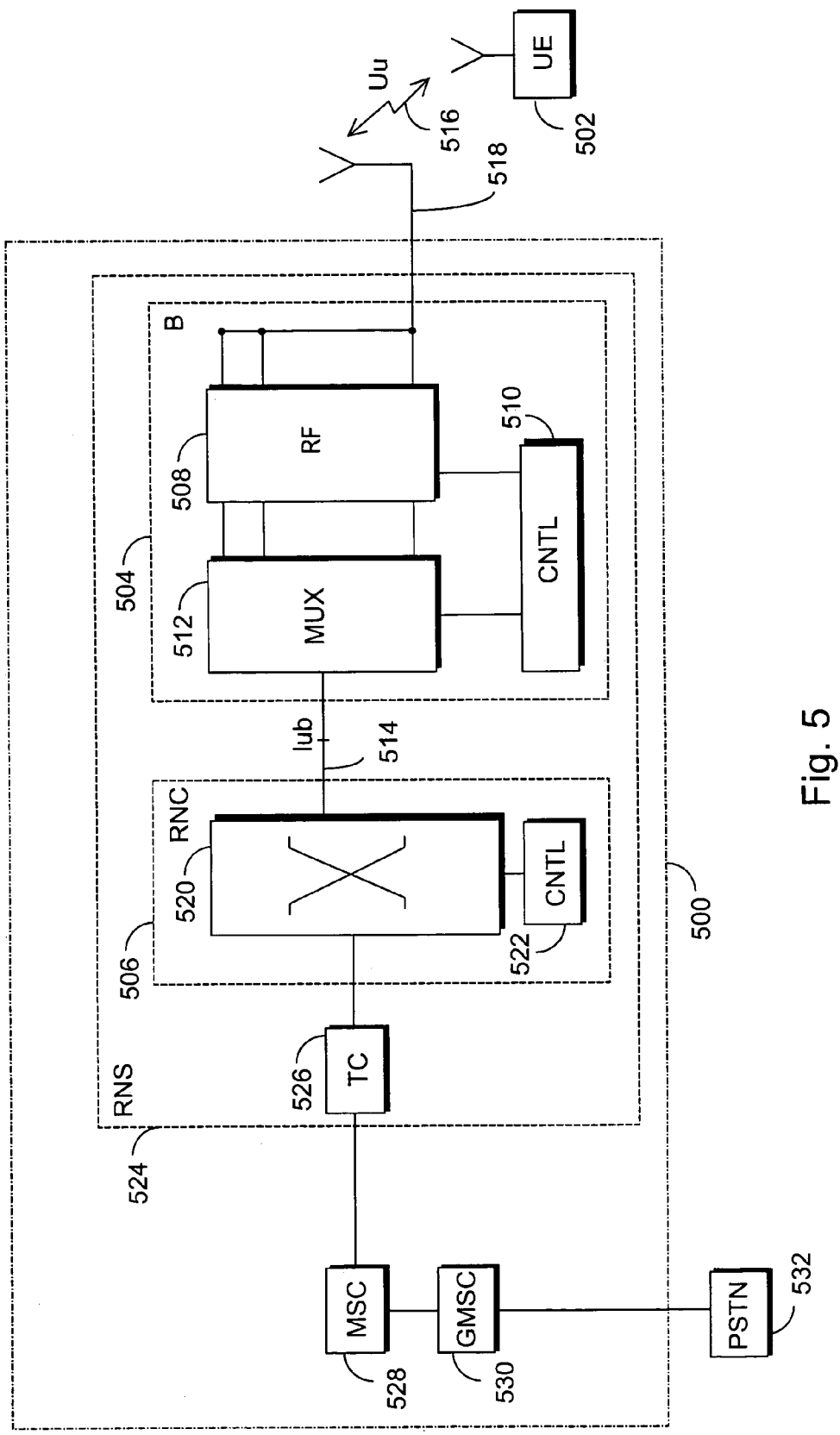
FIG. 5 shows a second example of a WCDMA telecommunications system.

The description of FIG. 4 is quite general, so FIG. 5 shows a more detailed example of a wideband cellular system. FIG. 5 only contains the most essential blocks, but it is clear to a person skilled in the art that a conventional cellular network also contains other functions and structures which need not be described in greater detail herein. The details of the cellular system may differ from what is shown in FIG. 5, but the differences are not significant for the invention.

A cellular network thus typically comprises a fixed network infrastructure 500 and user equipment 502, which can be fixed terminals, terminals located in a vehicle or portable terminals, such as mobile phones or portable computers which can access a radio telecommunications system. The fixed network infrastructure 500 comprises network parts, such as base stations 504. A base station corresponds to a node B of the previous figure. A radio network controller 506 controls in a centralized manner several base stations 504 connected to it. The base station 504 has radio frequency parts 508 and a multiplexing unit 512. In the example of FIG. 5, the radio frequency parts comprise both transmitting and receiving parts.

The base station 504 further has a control unit 510 which controls the operation of the radio frequency parts 508 and multiplexer 512. The multiplexer 512 places the traffic and control channels used by the radio frequency parts 508 on one transmission link 514. The transmission link 514 forms an interface Iub.

The radio frequency parts 508 of the base station 504 are connected to an antenna unit 518 with which a radio link 516 is established to the user equipment 502. The structure of the frames to be transmitted over the radio link 516 is defined specifically for each system and is called an air interface Uu.

The radio network controller 506 comprises a group switching field 520 and a control unit 522. The group switching field 520 is used for speech and data connection and to connect signalling circuits. The radio network subsystem 524 formed by the base station 504 and the radio network controller 506 also comprises a transcoder 526. The transcoder 526 is usually located as close as possible to a mobile switching centre 528, because it is then possible to transmit speech in cellular network format between the transcoder 526 and radio network controller 506, thus saving transmission capacity.

The transcoder 526 converts the different digital speech coding formats used between the public switched telephone network and cellular network to suit each other, for instance from the fixed network format to a cellular network format and vice versa. The control unit 522 takes care of call control, mobility management, collection of statistics, signalling and resource control and management.

FIG. 5 further shows a mobile switching centre 528 and a gateway mobile switching centre 530 which takes care of the connections of the mobile system to the outside world, herein to the public switched telephone network 532.

Figure 6:
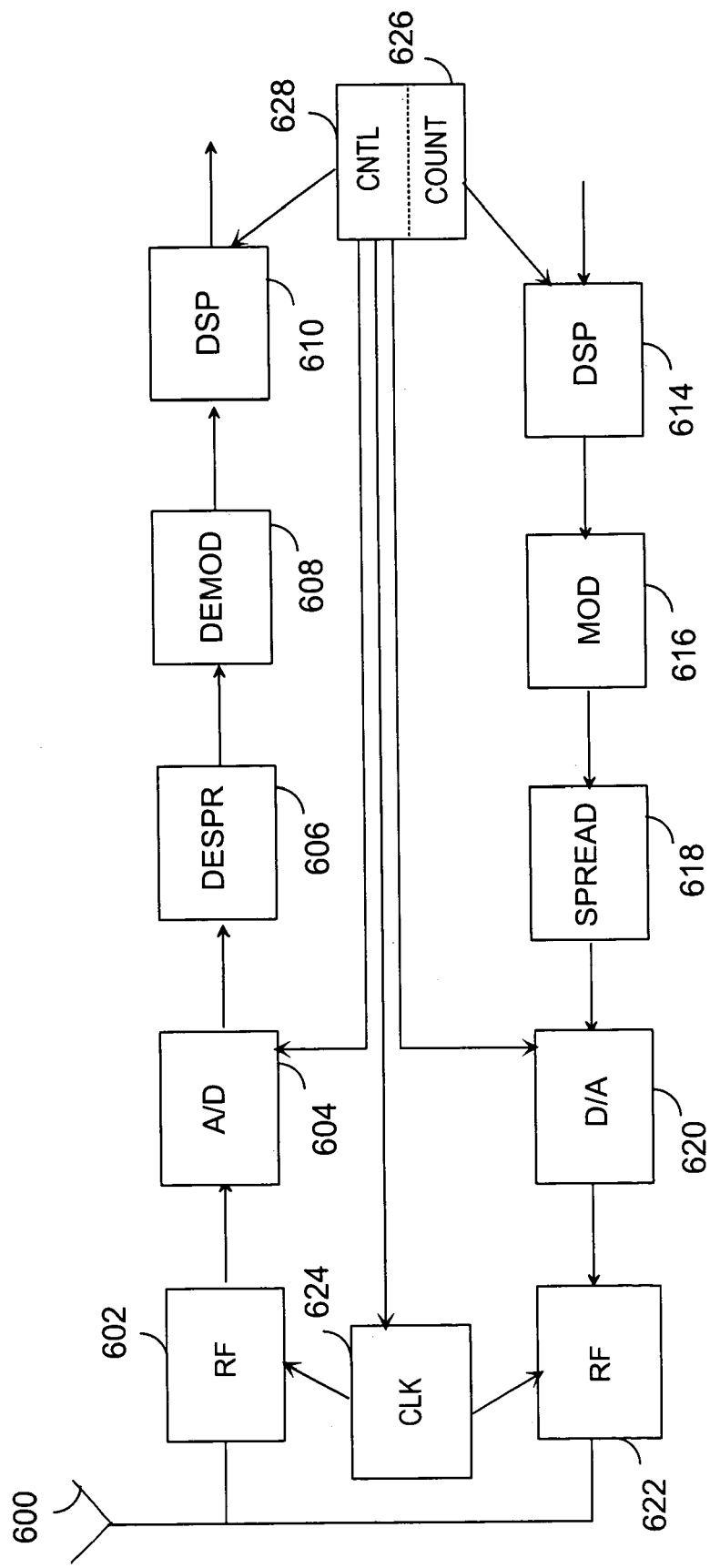
FIG. 6 shows an example of a WCDMA transceiver.

For the purpose of illustration, FIG. 6 shows as a block diagram a simplified example of a transceiver of a base station in a wideband data transmission system by means of an embodiment. It is clear to a person skilled in the art that the transceiver also contains other parts than those described above with reference to FIG. 6.

The transmitter is shown by means of blocks 614 to 622 and the receiver by means of blocks 602 to 610. In the example of FIG. 6, the radio parts of the transmitter and receiver are shown separately, but they can also be combined. Signal processing blocks 610 and 614 describe the equipment parts of the base station that are required to generate speech or data of the user in the transmitter. There may be only one signal processing block, or as in the example of the figure, one for the transmitter and one for the receiver. An information string, i.e. signal, comprising symbols, i.e. one or more bits, is processed in different ways in the transmitter. Signal processing, which includes coding, for instance, is usually done in a digital signal processor (DSP). If the transmission in the system comprises frames, and the frames comprise time slots, frame formation is typically performed in DSP, as is symbol interleaving.

In block 616, the signal is modulated using a desired modulation method. Signal coding and interleaving aims at making sure that the transmitted information can be restored in the receiver even though all information bits can not be received. Block 618 shows how information to be transmitted is multiplied by a spreading code in direct spreading spread-spectrum systems to spread a narrow-band signal to a wide band. The signal is converted from digital to analogue in block 620.

In RF parts 622, the signal is up-converted to a desired transmission frequency, amplified and, if necessary, filtered. In the example of the figure, both the transmitter and the receiver have the same antenna 600, in which case a duplex filter is required to separate the transmitted and received signals from each other. The antenna can be a single antenna or a group antenna comprising several antenna elements. The receiver comprises RF parts 602, in which the received signal is filtered, down-converted either directly to base band or to an intermediate frequency, and amplified. In block 604, the signal is converted from analogue to digital by sampling and quantizing, in block 606, the direct-spread wideband signal is de-spread by multiplying it by a code sequence generated by a code generator, in block 608, the effect of the carrier is removed from the signal by demodulation, and in block 610, the required signal processing, such as de-interleaving, decoding and deciphering, is performed.

The transceiver also comprises a clock 624 which provides the required clock frequencies. In WCDMA systems, the system clock provides the chip frequency 3.84 MHz and frame synchronization. The clock can be locally controlled by a control block 628 or it can be centrally controlled from somewhere else, for instance from a radio network controller 506. The control block 628 can also control other base station functions. The control block can also comprise a counter 626 for counting GSM frames for frame synchronization. The GSM frame synchronization method is described in greater detail in connection with the description of FIG. 7. The control block can also be a general control block 510 of the base station.

It should be noted that if a multi-mode base station comprising both a GSM-type system and a WCDMA-type system is implemented using one clock, as described later by means of FIG. 7, the clock 624 also provides the clock frequencies required by a base station of the GSM-type system, in which case the clock 212 of the GSM-type base station shown in FIG. 2 is not needed. A multi-mode base station clock can also be located in any possible common parts used by the base stations of different systems.

In a preferred embodiment, the receiver, such as a RAKE-type multi-finger receiver, comprises a delay estimator which estimates the delays of multipath propagated components. The delays of different RAKE fingers are set to correspond to the different delays of the signal components.

Figure 7:
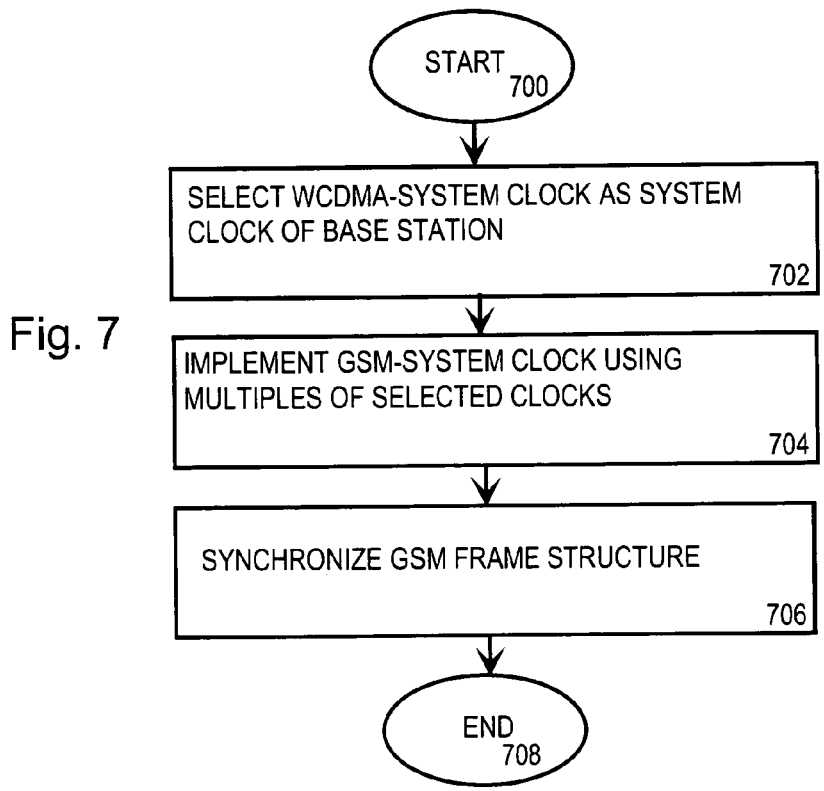
FIG. 7 shows a flow chart illustrating the method steps for implementing synchronization with one system clock.

The following describes by means of FIG. 7 the method steps for synchronizing a multi-mode base station using one clock, when the systems to be synchronized are a GSM-type telecommunications system and a WCDMA-type telecommunications system. The execution of the method starts in block 700. In block 702, the WCDMA system clock 3.84 MHz or a multiple thereof is selected as the system clock of the multi-mode base station. The selection is possible, because the system clocks of both GSM-type and WCDMA-type systems are multiples of 40 kHz: the chip rate of the WCDMA-type systems is 3.84 MHz, i.e. $2^5 \cdot 3 \cdot 40\,000$ Hz and the symbol rate of the GSM-type systems is 13 000 000/48 Hz, i.e. $13 \cdot 5 \cdot 5/48 \cdot 40\,000$ Hz. Therefore, the GSM clock can be generated by means of the WCDMA clock. In addition, because the symbol rate of the GSM-type systems is considerably lower than the chip rate of the WCDMA-type systems, the implementation of a digital channel filter becomes easier.

In block 704, the system clock of the GSM-type systems is implemented using multiples of the selected 3.84 MHz clock frequency by interpolating and decimalizing in a suitable manner utilizing the knowledge that the highest common factor of GSM-type and WCDMA-type system clocks is 40 000 Hz as described above. This way, the symbol frequency of the GSM-type system is generated.

In block 706, the frame structure of the GSM system is synchronized at intervals of thirteen frames or a multiple of thirteen frames. Because the WCDMA-type system clock was selected as the system clock of the multi-mode base station, the carrier frequency of the multi-mode base station is $f_c = n \cdot 2^5 \cdot 3 \cdot 40\,000$ Hz, wherein $n=1,2,\ldots$ and n should generally be selected to be as small a prime number as possible so that multi-rate filters can be used in channel filtering.

The carrier frequency $f_c$ divided by the frame rate of GSM-type systems is $$n \cdot 2^5 \cdot 3 / [13 \cdot 5 \cdot 5 / (48 \cdot 156.25 \cdot 8)] = n \cdot 2^5 \cdot 3 / [13/(25 \cdot 48)] \quad (1)$$

$$= n \cdot 2^5 \cdot 3 \cdot 25 \cdot 48 / 13$$

wherein

13·5·5/48 is derived from the symbol rate of GSM-type systems, $n \cdot 2^5 \cdot 3$ is derived from the carrier frequency used by the multi-mode base station (WCDMA-type system and GSM-type system), 156,25 is the number of symbols per time slot in GSM-type systems, and 8 is the number of time slots per frame.

Formula (1) shows that the frame rate of the GSM-type systems is not a multiple of the system clock of the WCDMA-type systems, but the timing of frames is at least substantially correct every thirteenth frame. Thus, the frame structure of the GSM system is synchronized at intervals of thirteen frames or a multiple of thirteen frames, for instance 26 frames. The synchronization frequency is selected according to the requirements of the system in use. The interval of the synchronization frames is preferably calculated by a counter which counts the frames, for instance, and the system times the beginning of the actual frame with the beginning of the thirteenth frame counted by the counter to be as matching as possible. A slight timing inaccuracy occurs in the frames between the synchronization frames, but the inaccuracy is very small as compared with the bandwidth of the carrier. The inaccuracy in timing is typically so small that it cannot even be measured in the air interface. Thus the frame synchronization is typically sufficiently correct.

It should be noted that because a WCDMA-type system clock was selected as the system clock of the multi-mode base station, the timing of WCDMA-type system frames is correct without any special action. In addition, because the clocks are typically implemented by oven-controlled oscillators, the clock frequency of which generally drifts to some extent, it is advantageous to use the method of the used system for synchronizing the system clock in addition to the synchronization method of a multi-mode base station described above.

Even though the invention has been explained in the above with reference to examples in accordance with the accompanying drawings, it is obvious that the invention is not restricted to them but can be modified in many ways within the scope of the inventive idea disclosed in the attached claims.

The invention claimed is:

1. A method comprising:
   synchronizing a multi-mode base station using one clock, when the systems to be synchronized are a GSM-type telecommunications system and a WCDMA-type telecommunications system;
   selecting the clock of the WCDMA-type system or a multiple thereof as the system clock of the multi-mode base station;
   implementing the system clock of the GSM-type system using multiples of the frequency of the selected clock;
   synchronizing the frame structure of the GSM-type system at intervals of thirteen frames or a multiple of thirteen frames.

2. A method as claimed in claim 1, wherein the system clock of the WCDMA-type system is 3.84 MHz.

3. A method as claimed in claim 1, wherein the system clock of the GSM-type system is 13 MHz.

4. A method as claimed in claim 1, wherein the WCDMA-type system is a UMTS system.

5. A method as claimed in claim 1, wherein the GMS-type system is GSM.

6. A method as claimed in claim 1, wherein the GMS-type system is GSM/EDGE.

7. A method as claimed in claim 1, wherein the GMS-type system is GPRS.

8. A method as claimed in claim 1, wherein the GMS-type system is EGPRS.

9. A method as claimed in claim 1, wherein the GMS-type system is IS-136HS.

10. An arrangement comprising:
    an implementing module configured to implement a system clock of a GSM-type system using multiples of a frequency of a WCDMA-type system clock, wherein the arrangement is configured to synchronize a multi-mode base station using one clock, when the systems to be synchronized are a GSM-type telecommunications system and a WCDMA-type telecommunications system; and
    a synchronization module configured to synchronize the frame structure of the GSM-type system at intervals of thirteen frames or a multiple of thirteen frames.

11. An arrangement as claimed in claim 10, wherein the system clock of the WCDMA-type system is 3.84 MHz.

12. An arrangement as claimed in claim 10, wherein the system clock of the GSM-type system is 13 MHz.

13. An arrangement as claimed in claim 10, wherein the WCDMA-type system is a UMTS system.

14. An arrangement as claimed in claim 10, wherein the GMS-type system is GSM.

15. An arrangement as claimed in claim 10, wherein the GMS-type system is GSM/EDGE.

16. An arrangement as claimed in claim 10, wherein the GMS-type system is GPRS.

17. An arrangement as claimed in claim 10, wherein the GMS-type system is EGPRS.

18. An arrangement as claimed in claim 10, wherein the GMS-type system is IS-136HS.

19. A multi-mode base station using one clock, the multi-mode base station comprising:
    implementing means for implementing a system clock of a GSM-type system using multiples of a frequency of a WCDMA-type system clock; and
    synchronizing means for synchronizing the frame structure of the GSM-type system at intervals of thirteen frames or a multiple of thirteen frames.

20. A multi-mode base station using one clock, the multi-mode base station comprising:
    an implementing module configured to implement a system clock of a GSM-type system using multiples of a frequency of a WCDMA-type system clock; and a synchronizing module configured to synchronize the frame structure of the GSM-type system at intervals of thirteen frames or a multiple of thirteen frames.

21. An arrangement, comprising:

implementing means for implementing the system clock of the GSM-type system using multiples of the frequency of the WCDMA-type system clock, wherein synchronizing a multi-mode base station using one clock, when the systems to be synchronized are a GSM-type telecommunications system and a WCDMA-type telecommunications system; and synchronizing means for synchronizing the frame structure of the GSM-type system at intervals of thirteen frames or a multiple of thirteen frames.

* * * * *